United States Patent [19]

Stier

[11] 3,960,037
[45] June 1, 1976

[54] MACHINE FOR TREATING TEETH OF SAW BLADES

[75] Inventor: Otto Stier, Biberach an der Riss, Germany

[73] Assignee: Vollmer Werke Maschinenfabrik GmbH, Biberach an der Riss, Germany

[22] Filed: Mar. 18, 1975

[21] Appl. No.: 559,645

[30] Foreign Application Priority Data

Mar. 18, 1974 Germany............................ 2412938
Mar. 18, 1974 Germany............................ 2412939

[52] U.S. Cl.......................................... 76/43; 76/75
[51] Int. Cl.²......................................... B23D 63/12
[58] Field of Search....................... 76/37, 43, 75, 76

[56] References Cited
UNITED STATES PATENTS

| | | | |
|---|---|---|---|
| 2,720,798 | 10/1955 | Hedlund ................................. | 76/43 |
| 2,977,822 | 4/1961 | Hamberger et al. .................... | 76/43 |
| 3,313,185 | 4/1967 | Drake et al. ............................ | 76/43 |
| 3,357,278 | 12/1967 | Bond....................................... | 76/43 |
| 3,766,806 | 10/1973 | Benner.................................... | 76/37 X |
| 3,815,446 | 6/1974 | Murphy .................................. | 76/43 |

*Primary Examiner*—James L. Jones, Jr.
*Assistant Examiner*—James G. Smith
*Attorney, Agent, or Firm*—Karl W. Flocks

[57] ABSTRACT

Machine for treating saw blades, in particular for sharpening teeth of circular saw blades, comprising a bearing unit for centrally mounting a circular saw blade of any diametrical dimension, a feed device for stepwise turning the saw blade by a tooth-pitch or multiple thereof, and a treating device for sharpening the teeth of a saw blade arranged to work in timed relationship with the device. The feed device and treating device being arranged diametrically opposite from each other with respect to the bearing unit. The feed device and bearing unit being arranged on common guide members for selective displacement in a ratio of 2:1 along a line extending diametrically to the saw blade to be treated to accommodate different size blades.

12 Claims, 7 Drawing Figures

MACHINE FOR TREATING TEETH OF SAW BLADES

The invention relates to a machine for treating, in particular, sharpening, the teeth of circular saws, comprising a bearing for centrally mounting a circular saw blade, a feed device for turning the circular saw blade stepwise by a tooth-pitch or a multiple of such tooth-pitch and a treating device working in timed coordination with the feed device.

In known machines of this kind, the feed device comprises a ratchet lever, that can be swung forward and backward about an axis that is parallel to the axis of the bearing provided for the circular saw blade or coincides therewith. The ratchet lever receives its swinging motion from a crank or cam drive. The free end of the ratchet lever supports a feed ratchet, which slides over a tooth or a plurality of teeth of the circular saw blade on every backward swinging of the ratchet lever, drops then into a tooth gap and, during the following swinging of the ratchet lever in the feed direction, presses against a tooth face or front of the circular saw blade and takes it along against its direction of cutting. At the end of the forward-oriented swinging of the ratchet lever, the tooth front is shifted forward by the feed ratchet and reaches a position that either coincides with the working position of the treating device or, if this is not allowed by the spatial conditions, it is removed from the working position by only one tooth-pitch or a small multiple thereof. The circular saw blade is held firmly by a clamping device during the backward swinging of the ratchet lever and the treatment of the circular saw blade. Any adjustment to circular saw blades of different diameter and different tooth pitch is time-consuming and difficult in machines of this kind, since, after the required adaptation of the ratchet lever to the diameter of a circular saw blade, one must adapt not only the magnitude of the swinging movement of the ratchet lever but also the starting point thereof to the tooth-pitch.

Accordingly, the invention is based on the task of developing and improving a machine of the type described, in such a manner that the machine can be more readily set to different circular saw blades.

The invention solves the problem by arranging the feed device in relation to the bearing diametrically opposite the treating device.

Because of this arrangement, the starting point of the feed movement is independent of the tooth-pitch, since circular saw blades always have an even number of teeth, so that after every feed movement the tooth which can be engaged by the treating device is faced exactly diametrically by a tooth that can be engaged by the feed device or a scanning device which controls the feed movement. Therefore, every tooth front is faced exactly diametrically by a tooth front, which is of importance above all for the sharpening or finish-grinding effected on the tooth front by a machine of the invention.

In a preferred embodiment of the invention, the feed device and the bearing members are arranged in adjustable manner on a common guide that extends diametrically to the circular saw and the feed device and the bearing can be displaced along the guide in the ratio of 2:1 by a common setting drive. This produces the additional advantage that only a single setting drive need by actuated for every adaptation of the machine to circular saws of different diameter even though, with the given arrangement of the treating device, the bearings must be adjusted in accordance with the radius and the feed device must be adjusted in accordance with the diameter of the circular saw.

The feed device and the bearing expediently engage threaded spindles, that are arranged in parallel relation with the guide, have the same pitch and can be rotated by the setting drive at the ratio of 2:1.

The guide may be made of two parallel, horizontal rails, that provide an intermediate space for the insertion of the circular saw blade, in which connection the bearings comprise two bearing blocks, guided in each case on one of the two rails and being displaceable by the same amounts. This structure is suitable also for circular saw blades of the largest diameter occurring in practice, which amount to about 2,000 mm at the present time, since also circular saw blades of such a size and corresponding weight can be mounted in a simple manner and reliably on the bearing blocks and one avoids the loading of the setting drive of the bearing by the weight of the circular saw blade, which could seriously affect the accuracy of the setting drive.

In the case of the structure described above, it is further expedient to arrange the feed device on a sliding carriage that is guided only on one of the two rails, with the feed device being transversely displaceable with respect to such a rail. This facilitates mounting heavy circular blades, suspended from a lifting unit, into the intermediate space between the two rails, since the feed device moved by a transverse shifting out of the intermediate space between the two rails cannot interfere during the insertion of the circular saw blade. However, when the circular saw blade is deposited on the bearing blocks, the feed device can be readily moved back into its working position. Therefore, the feed device need be displaced by a significant amount along its rail only in the case where an adaptation to circular saws of different diameter is required.

The intermediate space between the two rails is even more readily accessible for the insertion and removal of a circular saw blade, if the rail on which only a bearing block is guided has approximately only half the length of the rail on which the other bearing block and the sliding carriage of the feed device are guided.

Further, it is of advantage to have the feed device cooperate with a stop device, that is arranged beside the treating device and has a stop which, after a first phase of each feed movement, can be moved from a rest position into a working position in the tooth gap in front of the next tooth to be treated and releases a signal that stops the feed device, when the tooth front of such a tooth abuts against the stop device.

As further development of the features just described, one may provide that the feed device be equipped with a motor having a rapid speed and creeping speed and being so connected that, after each working cycle of the treating device, the rapid-speed mechanism turns the circular saw by an adjustable angle corresponding to the tooth-pitch reduced by a residual amount, whereafter the stop moves into its working position, triggers the creeping-speed mechanism and, after the stopping of the feed device, returns into its rest position, wherein it triggers the next working cycle of the treating device.

In order to subject the stop to the smallest possible wear, one may provide that the stop be moved from its working position in a tooth gap of the circular saw substantially at a right angle away from the tooth front into an intermediate position and only from there out of the tooth gap into its rest position.

An embodiment of the machine of the invention is suitable especially for circular saws that differ significantly from each other in size and weight, here the feed device includes a pair of friction rollers that can be pressed on the circular saw from both sides and, further, a scanning device that scans the teeth of the circular saw and stops the rapid-speed mechanism of the feed device when a tooth gap appears diametrically opposite the treating device. The scanning device may be constructed in this arrangement so as to scan the tooth gaps mechanically or, e.g., through electro-induction. However, an optical scanning device employing a light barrier is particularly effective for this purpose.

Finally, it is of advantage if at least one of the friction rollers constitutes a component of an electric circuit that is closed through the stop and the saw blade on abutment of a tooth front against the stop, in order to stop the feed device and actuate a clamping device for clamping the circular saw.

The invention further relates to a feed device for a saw-treating machine, comprising a pair of friction rollers that can be driven in rotation, are mounted in each case on a movable friction-roller support and can be pressed from both sides on a saw blade to be moved stepwise, in particular, a pivoted circular-saw blade to be moved stepwise.

The invention is based on the further task of developing a feed device for a saw-treating machine in such a manner that it can be readily adapted to saw blades of different thickness and each of its friction rollers can be driven positively from a common feed motor through a simple gearing.

The invention solves this problem in a feed device of the type described, in such a manner that the friction-roller supports are swingable about a common axis, which is identical with the axis of a driving worm, that can be driven by a feed motor and meshes with two worm gears, of which each is supported on one of the friction-roller supports and is connected, secured against rotation, to the friction roller associated therewith.

Because of this, the two friction rollers can be driven by the common feed motor, in each case through a single pair of gears, independently of the angular position assumed by the friction-roller supports in relation to the thickness of the saw blade to be moved.

In a preferred embodiment of the invention the friction-roller supports consist of two-armed levers and possess in each case an expanding roller, mounted in parallel relationship with the common pivot or axis of swinging on the lever arm that is turned away from the friction roller associated therewith. An expanding wedge guided radially to the pivot can be inserted into the intermediate space between the expanding rollers by means of an actuation device.

This invention is explained in greater detail with respect to the structure and use for sharpening circular-saw blades, by reference to the following drawings, in which.

Figure 1:
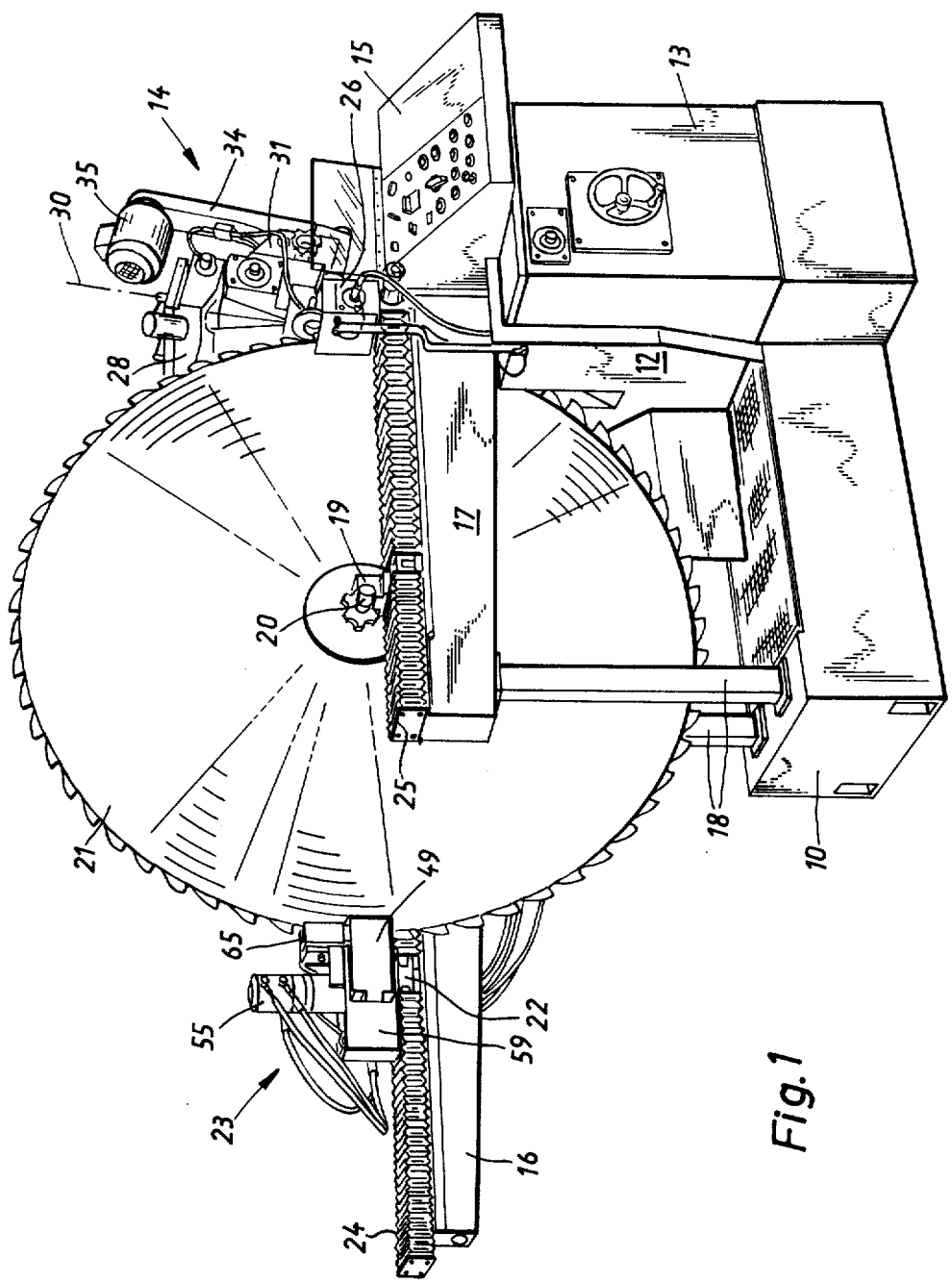
FIG. 1 shows a view in perspective of a machine according to the present invention for sharpening circular-saw blades.

The illustrated machine comprises a base 10, which includes an oil container and all the mechanism required for supplying the hydraulic needs of the machine, in particular an electric pump-driving motor 11. A machine column 12 and a switch box 13 are welded to base 10. A treating unit 14, i.e., a grinding unit in the example shown, is supported on column 12. A switch board 15 is arranged above switch box 13. Two horizontal rails 16 and 17 are arranged in parallel relationship to each other above base 10. Rails 16 and 17 are welded to column 12, in each case at their end, below treating unit 14, and are supported additionally on the base 10, in each case by means of a column 18. A bearing block 19 for a trunnion or pivot member 20 of a circular saw blade 21 is mounted for guided displacement on each rail 16 and 17. Additionally, a sliding carriage 22 is guided on rail 16, the carriage carrying a feed device 23. Feed device 23 is disposed diametrically opposite treating device 14, in relation to circular saw blade 21, and its distance from treating device 14 is twice as large as the distance of each of the bearing blocks 19 from such a device. Accordingly, the length of rail 16 is greater than the diameter of maximum circular saw blade 21 that is to be treated on the machine. Rail 17 is approximately only half as long as rail 16. Rails 16 and 17 are protected against dirt by means of bellows 24 and 25, respectively. Further, a stop device 26 is arranged diametrically opposite of feed device 23, i.e., in the vicinity of treating device 14.

Figure 2:
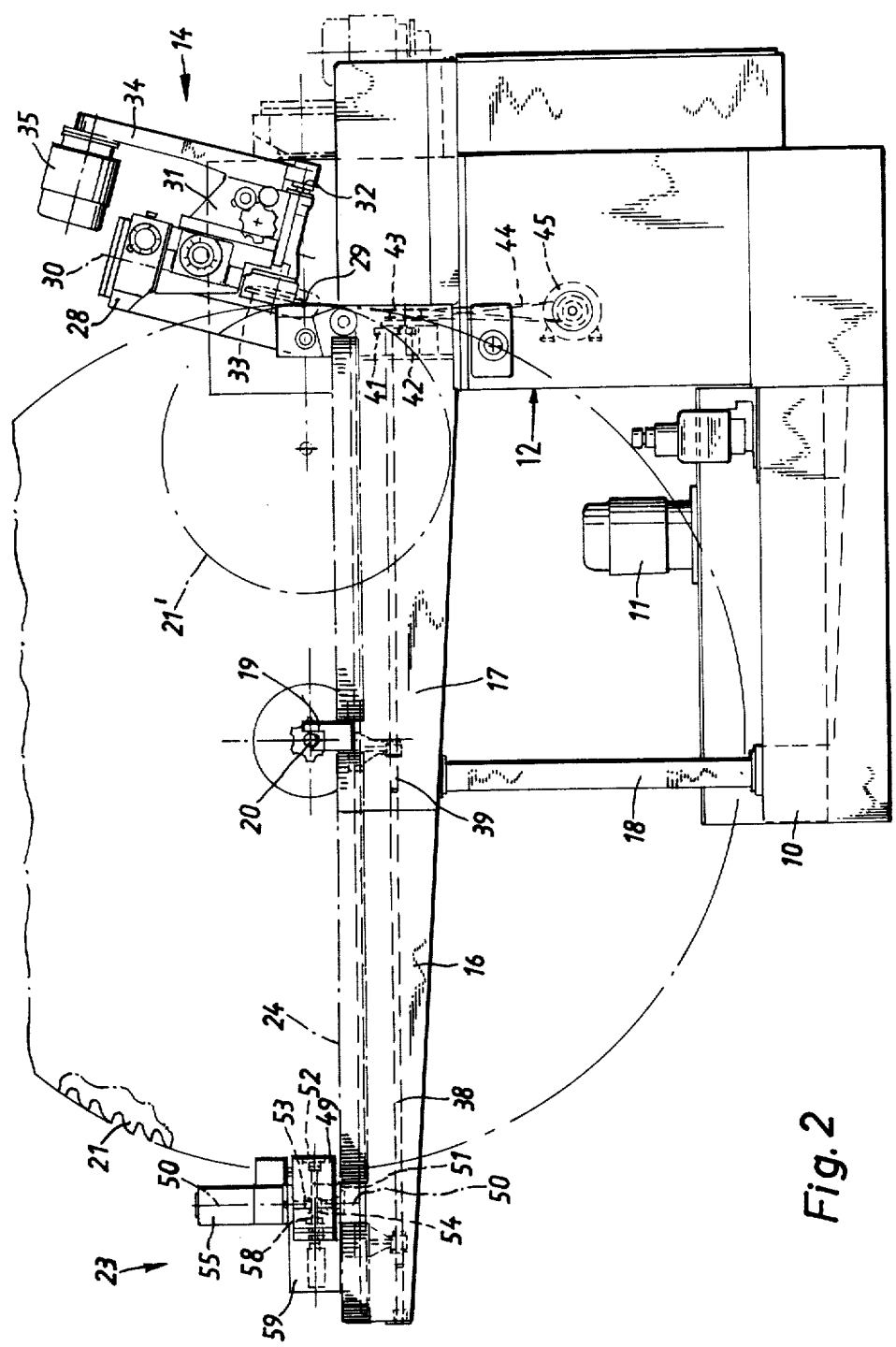
FIG. 2 shows a front elevation view of the machine.
Figure 3:
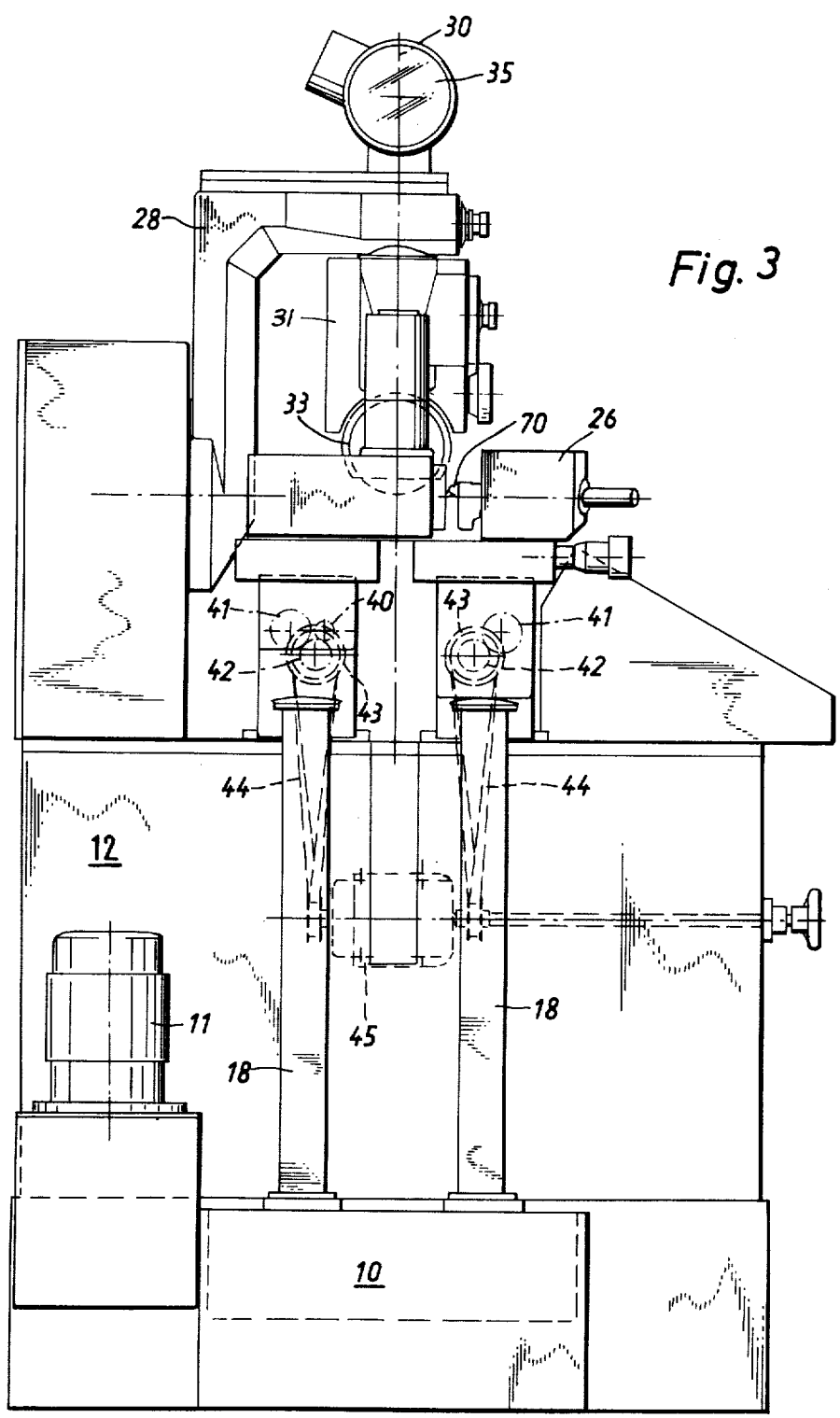
FIG. 3 shows an end elevation view of the machine.
Figure 4:
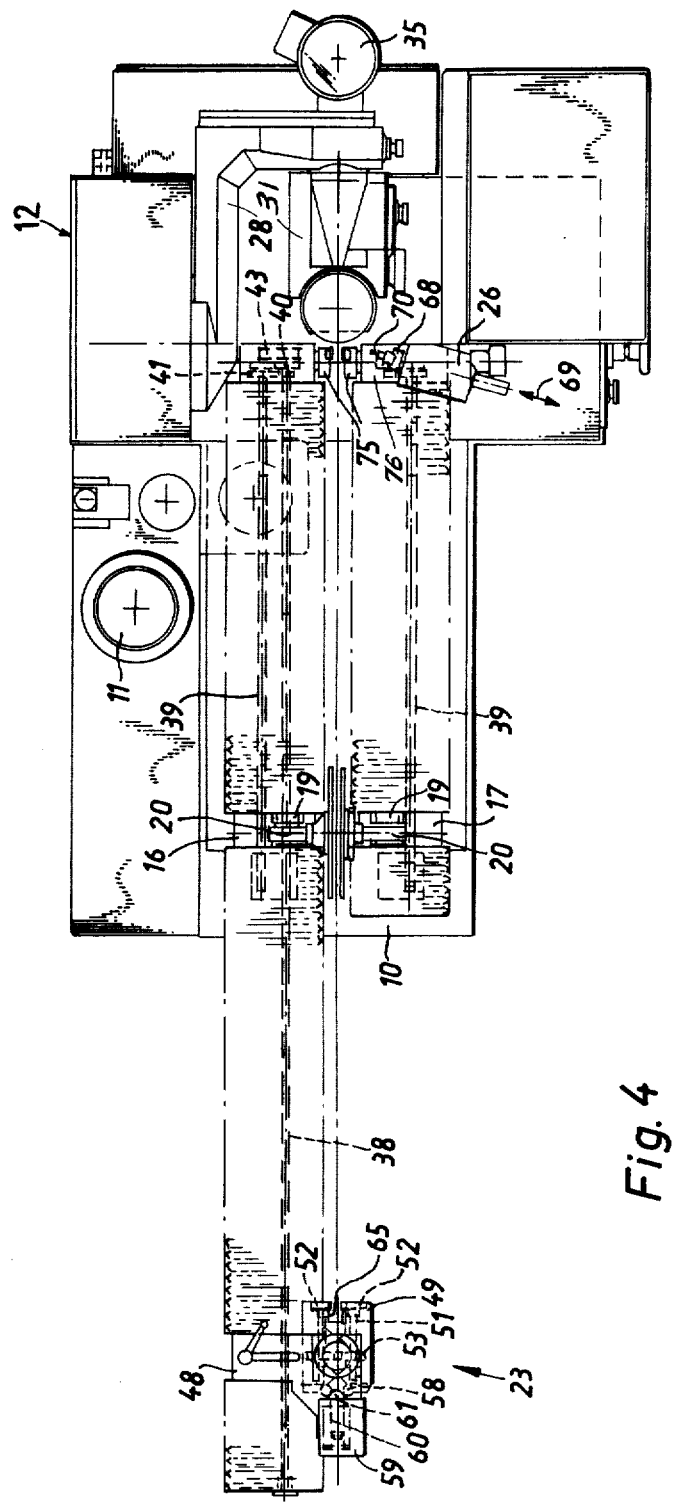
FIG. 4 shows a plan view of the machine.
Figure 5:
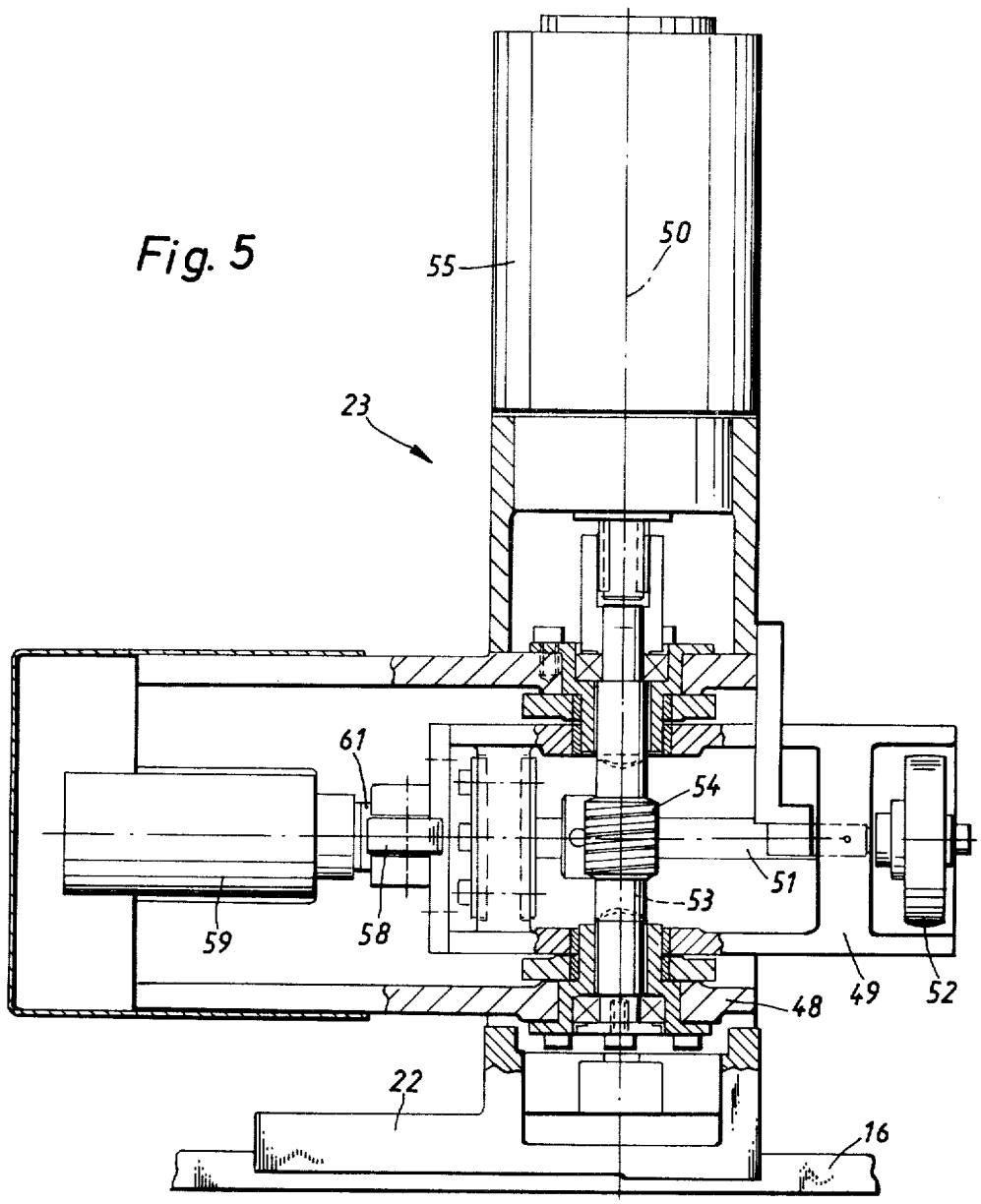
FIG. 5 shows a front elevation of the feed device of the machine, on an enlarged scale.
Figure 6:
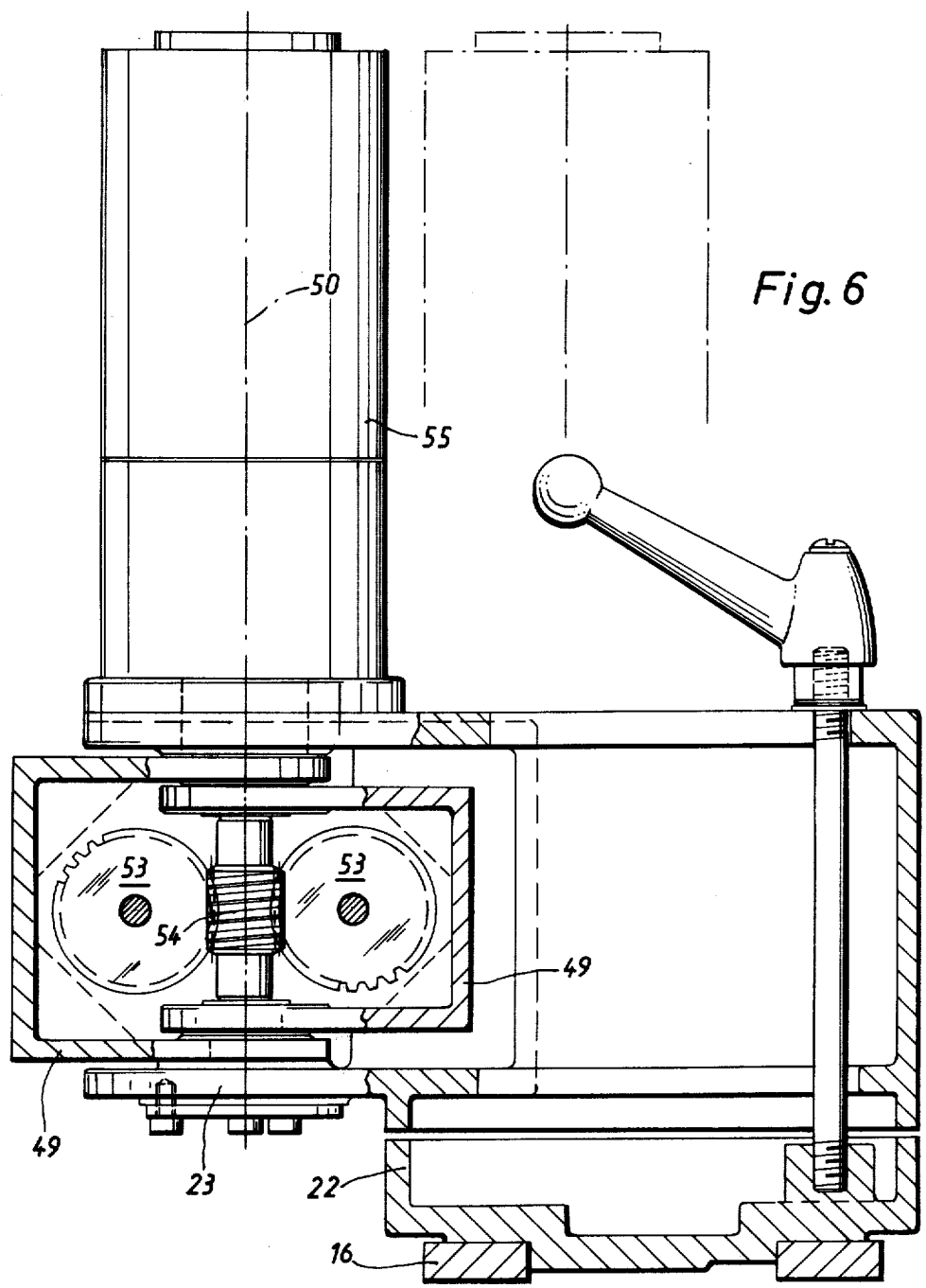
FIG. 6 shows a side elevation of the feed device in FIG. 5.
Figure 7:
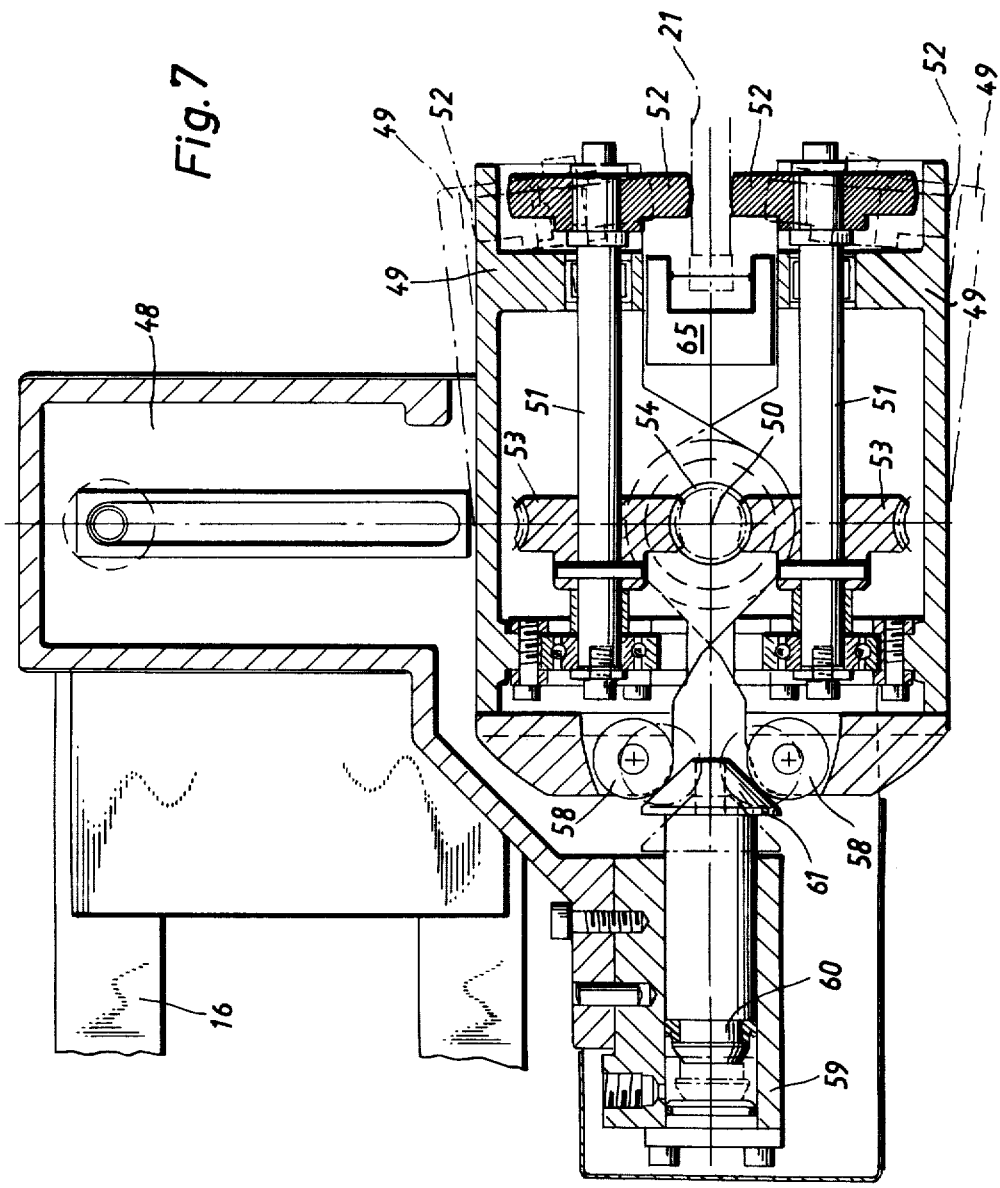
FIG. 7 shows a plan view of the feed device in FIG. 5.

Treating device 14 includes a tilting member 28, which is mounted on column 12 and may be tilted about an axis of tilting 29 extending parallel to pivot 20 of the saw blade 21, for the purpose of setting the rake angle and the clearance angle of the teeth of saw blade 21 to be sharpened. FIG. 2 shows tilting member 28 with solid lines in an upright position and with discontinuous lines in a horizontal position. FIG. 3 shows tilting member 28 only in its upright position. On the other hand, FIG. 4 shows tilting member 28 only in its horizontal position. Tilting member 28 is approximately C-shaped and has a cylindrical guide, that is indicated in the drawings merely through its geometrical axis designated in the following text as an axis of swinging 30. Axis of swinging 30 intersects axis of tilting 29 at right angle. Within C-shaped tilting member 28, a swinging part 31 is mounted with possibility of swinging about axis of swinging 30 to and fro between two adjustable end positions, which permits oblique grinding of the teeth and of producing bevelled edges of leader teeth. Swinging part 31 can be locked in its central position corresponding to the plane of the drawing in FIG. 2, for the purpose of grinding straight tooth flanks. In each of its swinging positions, swinging part 31 is capable of performing grinding strokes along axis of swinging 30. A grinding sleeve 32 is mounted in swinging part 31 and extends at a right angle to the axis of swinging 30 and, in the central position of the swinging part also at a right angle to the axis of tilting 29. A cup-shaped grinding disk 33 is attached to an end of grinding sleeve 32; the other end is connected to an electric motor 35 by means of a belt drive that is arranged with a hollow arm 34 of swinging part 31.

Two threaded spindles 38 and 39 of identical pitch are mounted parallel to each other inside rail 16, which has a hollow lower portion. Threaded spindle 38 extends substantially through the entire length of rail 16 and engages the thread of sliding carriage 22 of feed device 23. Threaded spindle 39 is approximately only half as long as threaded spindle 38 and engages the thread of bearing block 19 guided on rail 16. The two threaded spindles 38 and 39 carry a pinion 40 and 41 respectively on their end projecting into column 12. The number of teeth of pinion 41 is twice as large as the number of teeth of pinion 40. Both pinions 40 and 41 mesh with a gear 42 mounted in column 12 and attached to a gear 43. The latter gear is driven by means of a tooth-belt 44 through an electric motor 45 arranged in column 12.

A further threaded spindle 39 is disposed inside rail 17 which engages the thread of bearing block 19 associated therewith and is likewise connected to electric motor 45 through a pinion 41, gears 42 and 43 and a tooth-belt 44. Accordingly, when electric motor 45 runs, two threaded spindles 39 rotate with the same rpm and in the same direction of rotation and threaded spindle 38 rotates likewise in the same direction but with an rpm twice as large as that of the two threaded spindles 39. Besides, since the thread pitch of every threaded spindle 38 and 39 is the same, sliding carriage 22 with feed device 23 always moves in the same direction, but with double the speed of two bearing blocks 19 and, accordingly, within a given interval of time, through a distance twice as large as that of two bearing blocks 19.

Feed device 23 has a base plate 48, that can be displaced on sliding carriage 22 transversely to rail 16, so that feed device can assume according to choice the working position seen especially in FIG. 4 or a rest position, wherein feed device 23 no longer projects laterally beyond rail 16. Two friction-roller supports 49 are mounted on base plate 48 so as to be capable of swinging about a common vertical axis 50. A horizontal shaft 51 is mounted in each friction-roller support 49 and a friction roller 52 is attached to its end which faces bearing blocks 19. Additionally, a worm gear 53 is attached to each of the shafts 51; the two worm gears 53 mesh jointly with a worm 54 whose axis coincides with the axis of swinging 50 of the two friction-roller supports 49. Worm 54 is attached to the shaft of a hydraulic motor 55 having a rapid speed and a creeping speed.

Each of the two friction-roller supports 49 consists of a two-armed lever and has an additional roller 58 at its end which is turned away from friction roller 52 that is associated therewith, the axis of rotation of additional roller 58 being parallel to the axis of swinging 50. A cylinder 59 of a hydraulic piston-cylinder unit is attached to base plate 48, with its geometrical axis extending radially to the axis of swinging 50 between the two friction-roller supports 49. An wedge 61 is attached to a piston 60 of the piston-cylinder unit. When the rear side of piston 60 is subjected to pressure, the wedge is forced between the two additional rollers 58 and spreads the rollers apart so that friction rollers 52 are pressed from both sides toward circular saw 21. Because of this, circular saw 21 can be driven through the torque produced by hydraulic motor 55 and transmitted by worm 54, two worm gears 53, shafts 51 and friction wheels 52 and, indeed, as desired in one or the other of the two possible directions of rotation.

Further, a scanning device 65 in the form of a light barrier is arranged on base plate 48 of feed device 23. It scans the teeth and tooth-gaps of circular saw 21 engaging the intermediate space between friction-roller supports 49. The scanning device 65 changes the hydraulic motor 55 over from rapid speed to creeping speed when a tooth gap appears diametrically opposite the treating device 14.

Stop device 26 has a slide 68 that can be shifted to and fro approximately horizontally along a double arrow 69 shown in FIG. 4 and, for this purpose, it cooperates with a pneumatic or hydraulic operation device incorporated into stop device 26. A stop 70 is arranged at an end of slide 68. In the working position of slide 68 the stop engages the tooth gap of circular saw 21 that is to be engaged subsequently by grinding disk 33. Stop 70 forms an electrical contact within a circuit that is led from a voltage source (that is not illustrated) through electrically-conducting friction rollers 52 to circular saw 21 and is closed when the tooth front of a tooth of the circular saw blade contacts stop 70. Upon closure of said electrical circuit the hydraulic motor 55 is stopped. Stop 70 can be swung away from the tooth front about an approximately horizontal axis, by means of an actuation device (not clearly illustrated in the drawings), e.g., by means of an electromagnet, so that it no longer contacts the tooth front when the slide 68 returns into its rest position.

As customary, the illustrated machine possesses a pair of clamping jaws 75 that can be moved to and fro transversely to the plane of circular saw 21, by means of a hydraulic actuation device 76, in order to firmly secure the saw blade during thw grinding and to release it for the feed movement. The hydraulic actuation device 76 is controlled by said stop 70 in such a manner that the circular saw 21 is clamped between the clamping jaws 75 each time the tooth front of a tooth of the circular saw contacts the stop and thus closes said electrical circuit.

Although the invention has been described with a certain degree of particularity, it is understood that the present disclosure has been made only by way of example and the numerous changes in details of construction and the combination and arrangement of parts may be resorted to without departing from the spirit and scope of the invention as hereinafter claimed.

What is claimed is:

1. A machine for treating, in particular sharpening, the teeth of circular saw blades, comprising a base, bearing means for centrally mounting a circular saw blade, a feed means for turning the saw blade stepwise by a toothpitch or by a multiple of said tooth-pitch and treating means working in timed coordination with said feed means, said feed means being supported diametrically opposite from said treating means in relation to said bearing means, wherein said feed means and said bearing means are supported for displacement on common guide means, mounted on said base and extending diametrically to a circular saw blade mounted in said bearing means, and common setting drive means on said guide means for displacing said feed means and said bearing means along said guide means in the ratio of 2:1.

2. A machine as defined in claim 1, wherein said feed means and said bearing means engage threaded spindles, respectively, mounted on said base in parallel relationship with said guide means, having the same pitch and capable of being driven in rotation at the ratio of 2:1.

3. A machine as defined in claim 1, wherein said guide means includes two spaced-apart parallel, horizontal rails providing an intermediate space for interposing a circular saw blade and in that said bearing means includes two bearing blocks, each guided on one of said two rails and displaceable by the same amounts.

4. A machine as defined in claim 3, wherein said feed means further includes a sliding carriage that is guided only on one of said two rails, said feed means being mounted on said sliding carriage so as to be transversely displaceable in regard to said one of said two rails.

5. A machine as defined in claim 4, wherein the other of said two rails supports only one bearing block to be guided thereon, is approximately only half as long as said one rail on which the other bearing block and the sliding carriage of said feed means are guided.

6. A machine as defined in claim 1, further including stop means mounted on said base and located on the same side of said bearing means as said treating means and having a stop member for cooperation with said feed means, wherein after a first phase of each feed movement, said stop member can be shifted from a rest position into a working position in the tooth gap in front of the next tooth of a circular saw blade to be treated and triggers a signal which stops said feed means, when the tooth front of such a tooth abuts against it.

7. A machine as defined in claim 6 further including a motor for driving said feed means, said motor comprising a rapid speed and a creeping speed, said motor being mounted on said feed means and so connected that after each working cycle of the treating means said motor turns said circular blade at said rapid speed by an adjustable angle corresponding to the tooth pitch reduced by a residual amount, whereafter said stop member is moved into its working position, triggers the creeping speed mechanism and, after the feed means is stopped, it returns into its rest position, with which it triggers the next working cycle of said treating means.

8. A machine as defined in claim 6, wherein said stop member is supported on means for moving it from its working position in a tooth gap of the circular saw substantially at a right angle away from the tooth front into an intermediate position and only from there it can be moved out of the tooth gap into a rest position.

9. A machine as defined in claim 6, wherein said feed means includes a pair of friction rollers that can be pressed from both sides on said circular saw blade and scanning means for scanning the teeth of said circular saw blade and stopping the rapid speed drive of said feed means on appearance of a tooth gap diametrally opposite the treating device.

10. A machine as defined in claim 8, including a clamping device wherein at least one of said friction rollers constitutes a component of an electrical circuit that is closed by said stop member when a tooth front abuts against the stop member, in order to stop said feed means and actuate said clamping device for clamping said circular saw blade.

11. A feed device for a saw-treating machine comprising
a pair of friction-roller supports mounted on said machine for pivotal movement about a common axis,
driving worm means mounted on said machine for rotation about said common axis and operatively connected to a feed motor, and
a pair of friction roller means each of which is rotatably mounted on one of said friction-roller supports and connected to a worm gear meshing with said driving means, said friction roller means by pivotal said friction-roller supports being engageable with a saw blade mounted on said machine and partly between said friction-roller supports.

12. A feed device as defined in claim 11, wherein said friction-roller supports each comprise a two-armed lever having a first arm carrying one of said friction rollers and a second arm carrying additional roller means, a wedge member being guided on said feed device and adapted to be forced between the additional roller means by an actuating device operatively connected to said wedge member.

* * * * *